(12) United States Patent
Hatakeda et al.

(10) Patent No.: US 6,937,230 B2
(45) Date of Patent: Aug. 30, 2005

(54) NEWTON RING PREVENTION FILM AND TOUCH PANEL

(75) Inventors: Toshihiko Hatakeda, Tokyo (JP); Hiroshi Kukutsu, Tokyo (JP)

(73) Assignee: Nippon Paper Industries Co., Ltd, Tokyo (JP)

( * ) Notice: Subject to any disclaimer, the term of this patent is extended or adjusted under 35 U.S.C. 154(b) by 151 days.

(21) Appl. No.: 10/087,560

(22) Filed: Feb. 28, 2002

(65) Prior Publication Data

US 2002/0154100 A1 Oct. 24, 2002

(30) Foreign Application Priority Data

Mar. 8, 2001 (JP) ....................... 2001-064442
Feb. 15, 2002 (JP) ....................... 2002-037925

(51) Int. Cl.$^7$ .............................. G09G 00/50
(52) U.S. Cl. ................. 345/173; 345/176; 345/177; 178/18.08; 428/1.1
(58) Field of Search ................ 345/173, 176, 345/177, 178, 73, 80; 428/143, 144, 145, 34.4, 343, 345, 1.1; 178/18.02, 18.03, 18.08; 427/141, 164

(56) References Cited

U.S. PATENT DOCUMENTS

| | | | | |
|---|---|---|---|---|
| 5,422,737 A | * | 6/1995 | Atoji et al. ............... 358/492 |
| 5,459,198 A | * | 10/1995 | Sharp ..................... 525/102 |
| 6,104,530 A | * | 8/2000 | Okamura et al. ........... 359/359 |
| 6,261,665 B1 | * | 7/2001 | Murata et al. ............. 428/143 |
| 6,417,619 B1 | * | 7/2002 | Yasunori et al. ........... 313/582 |
| 6,495,253 B1 | * | 12/2002 | Koyama et al. ........... 428/343 |
| 6,559,915 B1 | * | 5/2003 | Amimori et al. .......... 349/112 |
| 6,611,229 B2 | * | 8/2003 | Muramatsu et al. ... 342/357.07 |
| 6,700,707 B2 | * | 3/2004 | Kashima et al. .......... 359/599 |

* cited by examiner

*Primary Examiner*—Xiao Wu
*Assistant Examiner*—Abbas Abdulselam
(74) *Attorney, Agent, or Firm*—Gary C Cohn PLLC

(57) ABSTRACT

A Newton ring prevention film comprising a transparent film in which projections are formed by surface roughening, a transparent film in which projections are formed by providing a projection coating layer, or either of these transparent films wherein a transparent electroconducting layer is further provided on the surface in which the projections are formed, and wherein the average surface roughness (RA)/inter-projection distance (SM) of the surface comprising the projection is $0.8 \times 10^{-3}$–$2.0 \times 10^{-3}$, and the inter-projection distance (SM) is 150 μm or less. Further, a touch panel is disclosed wherein a transparent electroconducting layer is provided as an upper electrode substrate and a transparent film or glass wherein a transparent electroconducting layer is provided as a lower electrode substrate, transparent electrode layers face the upper electrode substrate and lower electrode substrate at a predetermined interval, the average surface roughness (RA)/inter-projection distance (SM) of the transparent electrode layer surface of at least one of the upper electrode substrate and lower electrode substrate surface is $0.8 \times 10^{-3}$–$2.0 \times 10^{-3}$, and the inter-projection distance (SM) is 150 μm or less.

7 Claims, 1 Drawing Sheet

NEWTON RING PREVENTION FILM AND TOUCH PANEL

DETAILED DESCRIPTION OF THE INVENTION

1. Field of the Invention

This invention relates to a film for preventing or suppressing Newton rings, and more specifically to a film for preventing or suppressing halo patterns due to interference observed around a pen or finger when a resistance film touch panel is pressed by a pen or finger.

2. Prior Art

In recent years, due to the progress in electronic displays used as man machine interfaces, interactive input systems are becoming more generalized, specific examples which are widely used are ATM (automatic teller machine) wherein a touch panel is integrated with a display, product management, outworkers (diplomats, sales,) information displays and leisure equipment. In lightweight/and thin displays such as liquid crystal panels, the need for a keyboard can be eliminated, and use of this feature is increasingly made in touch panels for mobile devices.

Depending on the method used for position detection, the touch panel may be of various types, i.e., optical, ultrasonic, electrostatic capacitance, resistance film, etc. Of these, the resistance film type has been enjoying increasing popularity in recent years as it has a simple construction and its cost-performance ratio is high.

A resistance film touch panel is an electronic device wherein two films or plates comprising transparent electrically conducting films are formed a certain distance apart on opposite sides. By fixing one of the electrode and pressing the other electrode with a pen or finger from the viewing side, a detection path detects a position due to bending, contact or electrical conduction, and a predetermined input is thereby performed. In this process, interference colours known as Newton rings appear around the pointing device such as the pen or finger of used for the pressing, and the observational clarity of the screen decreases.

In order to alleviate Newton rings on this type of touch panel, methods have been devised wherein projections or depressions are provided in the film which functions as an electrode substrate.

For example, in Japanese Patent Laid-Open Hei 11-250764, a projection or depressions is provided by embossing in the film, and its surface is adjusted to a specified roughness. In Japanese Patent Laid-Open Hei 7-169367, projections or depressions having a predetermined surface roughness are likewise formed at a predetermined pitch by embossing in the film. In Japanese Patent Laid-Open Hei 9-272183, a resin comprising a filler coated on a film, or the film is pressed onto a roller having projections or depressions to transfer the projections or depressions, and form projections or depressions wherein peaks of predetermined height are formed at a predetermined intervals. In Japanese Patent Laid-Open Hei 8-281856, a transparent electroconducting layer is provided on a rough surface, and the height of the rough surface and inter-projection distance are specified. In Japanese Patent Laid-Open 10-32391, a filler having a predetermined average particle diameter is coated to a predetermined number average density on a film, and a transparent electroconducting layer is formed on this coating.

However, in all these cases, attention was paid only to the size of the projections or depressions, and even if the pitch between the projections or depressions was considered, there was no attempt to study the relationship between the height (i.e., roughness) and inter-peak distance which would prevent Newton rings from appearing.

Problems which this Invention Attempts to Solve

When a plastic film comprising a transparent electrode layer bends, Newton rings appear due to optical interference. In particular, in the case of a resistance film touch panel, when two transparent electrodes come into contact or are bent to contact each other, Newton rings are generated by optical interference in the wedge-shaped space between the two transparent electrodes facing each other, at intervals of about the wavelength of visible light (approximately 0.5 $\mu$m). This is a phenomenon which is unavoidable due to the principle of operation of the resistance film touch panel.

It is therefore an object of this invention to prevent or suppress Newton rings when a plastic film comprising transparent electrode layers is bent, and in particular prevent or suppress Newton rings generated around a position where a pointing device is input to a resistance film touch panel without compromising the functionality and performance of the touch panel.

SUMMARY OF THE INVENTION

It is said that the horizontal resolution of the human eye is approximately six lines per mm (for a person with a visual acuity of 1.0 at a distance where he has distinct vision). Hence, by providing projections on at least one surface of the transparent electrodes so that the transmitted light rays are refracted and an observer cannot recognize continuous Newton rings, Newton rings can effectively be prevented.

The Inventor discovered that by using a film comprising a transparent electrode film with specific projections, the Newton rings were not observed due to human visual characteristics.

Transparent electric conducting films facing each other in a touch panel become electroconducting when they are pressed into contact. A voltage (several volts) is applied within a range such that insulation breakdown does not occur based on Paschen's Law, but when projections are provided on the transparent electroconducting film, a corona discharge may occur due to concentration of the electric field between the opposite electrodes, and the transparent electroconducting film may be damaged.

In this connection, the Inventor further studied the relation between the roughness of the film used as a resistance film touch panel and the inter-projection distance. As a result, it was found that by setting the curvature (projection roughness/inter-projection distance) of the projections to a fixed value or less, and by setting the inter-projection distance to 150 $\mu$m or less, a film was obtained wherein Newton rings were not observed, and Newton rings could be prevented (or suppressed) without compromising the functions of the touch panel (i.e., without causing abnormal electrical discharges).

It is therefore an object of this invention to provide a Newton ring prevention film comprising a transparent film in which projections are formed by surface roughening, a transparent film in which projections are formed by providing a projection coating layer, or either of these transparent films wherein a transparent electroconducting layer is further provided on the surface in which the projections are formed, wherein the average surface roughness (RA)/inter-projection distance (SM) of the surface comprising the projection is $0.8 \times 10^{-3} - 2.0 \times 10^{-3}$, and the inter-projection distance (SM) is 150 $\mu$m or less.

When this Newton ring prevention film comprises a transparent film wherein projections are formed by providing a projection coating layer, or a transparent film wherein a transparent electric conducting layer may also be provided on the surface in which the projections are formed, the projection coating layer may be a coating film in which silica is dispersed in a resin.

It is a further object of this invention to provide a touch panel using a transparent film covered by a transparent electroconducting layer as an upper electrode substrate and a transparent film or glass covered by a transparent electroconducting layer as a lower electrode substrate, said upper electrode substrate and said lower electrode substrate being set at a predetermined interval apart with the transparent electrode layers facing each other, wherein the centerline average surface roughness (RA)/inter-projection distance (SM) of the transparent electrode layer surface of at least one of said upper electrode substrate and said lower electrode substrate surface is $0.8 \times 10^{-3} - 2.0 \times 10^{-3}$, and the inter-projection distance (SM) is 150 $\mu$m or less.

It is yet another object of this invention to provide a touch panel wherein at least one of the transparent films used for the upper electrode substrate and/or lower electrode substrate is a Newton ring prevention film having a transparent electrode layer.

The transparent electroconducting layer preferably comprises indium oxide ($In_2O_3$).

PREFFERED EMBODIMENTS OF THE INVENTION

Figure 1:
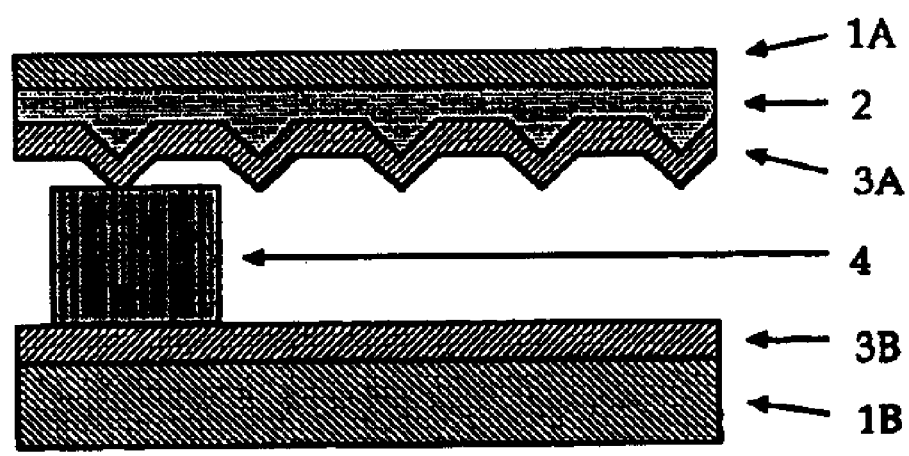
FIG. 1 shows the basic construction of the touch panel of this invention. 1A represents Substrate (transparent film), 1B represents Substrate (glass plate), 2 represents Projection coating layer, 3A and 3B represent Transparent electroconducting layers, and 4 represents Spacer.

The Newton ring prevention film of this invention comprises projections (i.e., projections and depressions), and the projections may be formed by roughening a transparent plastic substrate and by sandblasting, embossing or the like, or by coating a paint material comprising a transparent resin and pigment onto a plastic substrate. In this invention, the latter method is preferred as it can form the aforesaid projections easily. A transparent electroconducting layer may also be formed on the film in which these projections are formed. The projection coating layer is provided such that it does not interfere with the forming of the transparent electroconducting layer.

The touch panel of this invention comprises an upper electrode substrate, lower electrode substrate and the means for maintaining the gap between these electrodes constant. As the upper electrode substrate, a transparent film which forms a transparent electric conducting layer is used, as the lower electrode substrate, a transparent film substrate or glass substrate which forms a transparent electroconducting layer is used, projections are provided by the above-described method on at least one of the surfaces comprising the transparent electroconducting layers of the upper electrode substrate and lower electrode substrate, and the upper electrode substrate and lower electrode substrate are disposed such that the transparent electrode layers are facing each other at a predetermined interval apart. This upper electrode substrate refers to the side which is depressed by a finger or a pointing device. A suitable insulating layer or supporting layer may be provided between these layers.

Further, this touch panel can be arranged on top of a display device such as an LCD. The component parts of the touch panel must all be transparent, but it is not necessary that they are completely transparent since it is sufficient if they are transparent enough to recognize characters and graphics to the required extent through the touch panel.

The film or transparent film in this invention specifically refers to a transparent plastic film, there being no particular limitation providing it has transparent properties. Examples are polyester film, polypropylene film, diacetyl cellulose film, triacetyl cellulose film, acetyl cellulose butyrate film, polycarbonate film, polymethyl pentyl film, polysulphone film, polyethyl ethylketone film, polyethyl sulfones film, polyethylimide film, polyimide film, fluorine resin film and acrylic film.

The thickness of this transparent plastic film is normally of the order of 0.1–0.25 mm.

The transparent plastic plate may also employed a plastic plate of identical material to the aforesaid transparent found. There is no particular limitation on its thickness, which is suitably determined considering the strength required of the touch panel, and its thickness is normally of the order of 0.25–5.0 mm. For the glass plate, an ordinary glass plate of identical thickness is used.

From the viewpoint of production efficiency of the coating process, whatever the construction of the touch panel, it is advantageous to provide the projection coating layer on the side of the electrode of the film substrate. The projections may be formed by continuous coating on the film by dispersing a pigment in a resin and using any desired coater. Any resin may be used provided it is a material which does not interfere with the formation of the transparent electroconducting layer, but it is preferred that it is a crosslinking resin with a small volatile fraction after drying and curing. For example, ultraviolet curing resins, electron radiation curing resins, melamine resins, acrylic resins, acrylic/urethane resins, acrylic/melamine resins and epoxy resins may be used.

The pigment may be silicon oxide, magnesium fluoride, calcium carbonate or a plastic pigment. Due to the intended use (touch panel), silicon oxide (silica) is convenient as it does not block light much, and is economical.

To obtain the desired surface roughness, the average aggregate particle diameter of the pigment is preferably 1.0–3.0 $\mu$m. It is preferred that the particle diameter of the pigment is uniform, and that the standard deviation does not exceed 1.0. Herein, the average aggregate particle size of the pigment is a value measured by the Coulter Counter method. In this method, the volume and number of particles suspended in an electrically conducting liquid such as an electrolyte solution are electrically detected to measure the particle size, and the number distribution of the particle size is then obtained. A suitable blending proportion of resin to pigment (weight ratio after drying) is 99.5:0.5–99.0:1.0.

The thickness of this projection coating layer is normally of the order of 1.0–20.0 $\mu$m. If the coating layer is too thick, its transparency decreases, so the preferred range is 1.0–10.0 $\mu$m.

The transparent electroconducting layer is formed by adhesion of an electroconducting substance such as $In_2O_3$ using a method such as sputtering or vapor deposition, or by vapor phase epitaxy. Its thickness is normally of the order of 0.020–0.025 $\mu$m.

The touch panel has a construction such that the interval between the upper electrode substrate and lower electrode substrate is maintained constant using a spacer or another insulating layer or adhesive layer. Although it depends on the construction of the touch panel, this interval is normally 30 μm or less. When the interval is large, pen response decreases, so it is preferably 15 μm or less.

The spacer may be electrically insulating, and may be provided by the methods known in the art without any particular limitation. For example, this may be done by forming a UV curing resin layer on the electroconducting layer, and carrying out exposure patterning by photolithography. It may also be provided by a printing technique using a method such as screen printing or gravure printing wherein the electroconducting layer is printed by a transparent ink such as a urethane resin or silicone resin. Also, spherical particles having graded particle sizes may be dispersed between the facing electrodes and used as a spacer.

In this invention, the centerline average surface roughness (Ra) is measured according to JIS B0601 by a surface roughness meter. The inter-projection distance (Sm) is deduced from a roughness curve according to JISB0601 by the surface roughness meter. The curvature (Ra/Sm) of the projections must be $0.8 \times 10^{-3} - 2.0 \times 10^{-3}$. If the value is smaller in this range, Newton rings cannot be prevented, and if it is larger than this range, insulating defects (abnormal discharges) tend to occur easily. A particularly preferred range is $1.0 \times 10^{-3} - 1.7 \times 10^{-3}$. In this invention, Ra and Sm refer to the transparent film in which projections are formed by roughening, or to a surface in which projections in a transparent film are formed by providing a projection coating layer. Even if a transparent electroconducting layer is also provided, it has very little effect on these numerical values, so Ra and Sm when the transparent electroconducting layer is provided are no different to Ra and Sm before the transparent electric conducting layer is added.

EXAMPLES

This invention will now be described by specific examples and its characteristics will be described referring to comparative examples, but the invention is not to be construed as being limited thereby. The terms "parts" and "%" in the examples referred to "weight parts" and "weight %" respectively unless otherwise specified. The average particle size of the pigment blended with the coating solution and its standard deviation were measured by a Multisizer 3 (Beckmann Coulter Inc.).

FIG. 1 shows the basic construction of the touch panel of this invention. 1A is an upper substrate such as glass, a film or a plastic plate, 2 is a projection coating layer comprising a pigment, 3A is a transparent electroconducting layer formed on the projection coating layer 2, 1B is the lower substrate such as glass, a film or a plastic plate, 3B is a transparent electric conducting layer formed thereon, and 4 is a spacer for maintaining the interval between the two electrodes constant.

Example 1

The substrate 1A, which is the upper electrode substrate, was a polyester film of thickness 188 μm (Diafoil Hoechst Co., Ltd., O-300E-188), and a coating layer was provided by coating a coating solution having the composition given below on one of its surfaces using a wire bar #5. After heat-drying, the coating layer was irradiated from a distance of 10 cm for 1 second by a 120 W/cm UV lamp to form the projection coating layer 2. Its thickness was 5 μm.
Composition of Coating Solution
Acrylic UV curing resin: 99.5 weight parts (Arakawa Chemicals Inc., Beam Set 550B) Amorphous silica: 0.5 weight parts (SYLYSIA 430, Fuji Sylysia Chemicals, was crushed to give an average secondary particle diameter 1.7 μm, standard deviation 0.5).
Photoreaction initiator: 5.0 weight parts (Ciba Geigy Ltd, IRGACURE 184)
Isopropyl alcohol: suitable amount as diluent for adjusting viscosity.

For this projection coating layer 2, Ra was measured according to JIS B0601 using a surface roughness meter (SE30K, Kosaka Research Labs.), and Sm was computed by finding the roughness curve according to JIS B0601 using the same surface roughness meter.

Next, a transparent electroconducting layer 3A was formed by sputtering $In_2O_3$ (ITO) on the projection coating layer 2, to form the upper electrode substrate. The thickness of this transparent electroconducting layer 3A due to ITO treatment was determined to be 0.02 μm. The roughness (Ra) after providing this transparent electroconducting layer was no different to the roughness prior to providing the transparent electroconducting layer.

Further, the lower electrode substrate was manufactured by providing a transparent electroconducting layer 3B by ITO treatment in the same way, using a glass plate as the substrate 1B. A photocuring acrylic resin layer was then provided on the transparent electroconducting layer 3B of the lower electrode substrate, and patterned by exposure to UV light to form the spacer 4. This spacer 4 was a cylinder of height 9 μm and diameter 30 μm, and the spacer interval was 3 mm.

A touch panel was constructed by disposing the transparent electroconducting layers so that the upper electrode substrate and lower electrode substrate are facing each other as described above. The interval between the upper electrode substrate and lower electrode substrate corresponds to the height of the spacer.

The touch panel manufactured as described above was subjected to insulation tests according to the following procedure, and the effect on Newton rings was examined.
Insulation Tests
A DC voltage of 25V was applied between the facing transparent electrode layers (3A, 3B) of the touch panel, the resistance between these electrode layers was measured, and the insulation properties were evaluated. Regarding the insulation properties of the touch panel, the inter-electrode resistance must be 20 M ohm or higher, and if it was less than 20 M ohm, the insulation was determined to be defective. If the insulation is defective, an abnormal corona discharge is produced due to the concentrated electric field, and this damages the transparent electroconducting layers.
Examination of Newton Ring Effect
The upper electrode substrate of the touch panel was pressed the tip of a pen with a pressure of 26 g/cm, and the status of the Newton rings was verified by visual observation.

Example 2

A touch panel was constructed in an identical manner to that of Example 1, except that the blending proportion of the coating solution used to form the projection coating layer was, acrylic UV curing resin: 99.2 weight parts, amorphous silica: 0.8 weight parts. The same tests as those of Example 1 were performed.

Example 3

A touch panel was constructed in an identical manner to that of Example 1, except that the blending proportion of the coating solution used to form the projection coating layer was, acrylic UV curing resin: 99.0 weight parts, amorphous silica: 1.0 weight parts. The same tests as those of Example 1 were performed.

Comparative Example 1

A touch panel was constructed in an identical manner to that of Example 1, except that the blending proportion of the coating solution used to form the projection coating layer was, acrylic UV curing resin: 99.9 weight parts, amorphous silica: 0.1 weight parts. The same tests as those of Example 1 were performed.

Comparative Example 2

A touch panel was constructed in an identical manner to that of Example 1, except that the blending proportion of the coating solution used to form the projection coating layer was, acrylic UV curing resin: 99.8 weight parts, amorphous silica: 0.2 weight parts. The same tests as those of Example 1 were performed.

Comparative Example 3

A touch panel was constructed in an identical manner to that of Example 1, except that the blending proportion of the coating solution used to form the projection coating layer was, acrylic UV curing resin: 98.5 weight parts, amorphous silica having an average secondary particle diameter of 4.0 $\mu$m (standard deviation 1.5):1.5 weight parts. The same tests as those of Example 1 were performed.

Comparative Example 4

A touch panel was constructed in an identical manner to that of Example 1, except that in Example 1, the amorphous silica blended with the coating solution used to form the projection coating layer was amorphous silica having an average aggregate particle diameter of 1.5 $\mu$m (standard deviation 1.5). The same tests as those of Example 1 were performed.

Comparative Example 5

A touch panel was constructed in an identical manner to that of Example 1, except that the blending proportion of the coating solution used to form the projection coating layer was, acrylic UV curing resin: 98.5 weight parts, amorphous silica: 1.5 weight parts. The same tests as those of Example 1 were performed.

The results of the insulation tests and Newton ring tests of Examples 1–3 and Comparative Examples 1–5, are shown in Table 1.

It was found that, for the touch panels of Examples 1–3 wherein Ra/Sm was $0.8 \times 10^{-3}$–$2.0 \times 10^{-3}$ and Sm was 150 $\mu$m or less, Newton rings were prevented, and insulation properties were good. On the other hand, for all the touch panels of Comparative Examples 1–5 which did not satisfy the above conditions of Ra/Sm=$0.8 \times 10^{-3}$–$2.0 \times 10^{-3}$ and Sm=150 $\mu$m or less, either Newton rings were observed or insulation was defective.

Advantages of the Invention

The Newton ring prevention film of this invention effectively prevents Newton rings. In particular, when a Newton ring prevention film having a transparent electroconducting layer is used for a resistance film touch panel, a decline of visual clarity of the display due to Newton rings is suppressed to a minimum, and that the same time, a decline of functions of the touch panel due to abnormal discharge is suppressed.

What is claimed is:

1. A Newton ring prevention film comprising a transparent film in which projections are formed by surface roughening, a transparent film in which projections are formed by providing a projection coating layer, or either of these transparent films wherein a transparent electroconducting layer is further provided on the surface in which the projections are formed, wherein the average surface roughness (RA)/inter-projection distance (SM) of the surface comprising the projection is $0.8 \times 10^{-3}$–$2.0 \times 10^{-3}$, and the inter-projection distance (SM) is 150 $\mu$m or less.

2. The Newton ring prevention film as defined in claim 1, comprising a transparent film in which projections are formed by providing a projection coating layer, or a transparent film wherein a transparent electroconducting layer is further provided on the surface on which the projections are formed, wherein the projection coating layer is a coating film wherein silica is dispersed in a resin.

3. The Newton ring prevention film as defined in claim 2, wherein the average aggregate particle size of said silica is 1.0–3.0 $\mu$m, and its standard deviation is 1.0 or less.

4. A touch panel using a transparent film covered by a transparent electroconducting layer as an upper electrode substrate and a transparent film or glass covered by a transparent electroconducting layer as a lower electrode substrate, said upper electrode substrate and said lower electrode substrate being set at a predetermined interval apart with the transparent electrode layers facing each other, wherein the centerline average surface roughness (RA)/inter-projection distance (SM) of the transparent electrode layer surface of at least one of said upper electrode substrate and said lower electrode substrate surface is $0.8 \times 10^{-3}$–$2.0 \times 10^{-3}$, and the inter-projection distance (SM) is 150 $\mu$m or less.

5. The touch panel as defined in claim 4, said at least one of parent films used for the upper electrode substrate and/or lower electrode substrate includes a Newton ring prevention film comprising a transparent film in which projections are formed by surface roughening, a transparent film in which projections are formed by providing projection coating

TABLE 1

|  | Example 1 | Example 2 | Example 3 | Comparative Example 1 | Comparative Example 2 | Comparative Example 3 | Comparative Example 4 | Comparative Example 5 |
| --- | --- | --- | --- | --- | --- | --- | --- | --- |
| Centerline roughness: Ra ($\mu$m) | 0.135 | 0.115 | 0.123 | 0.069 | 0.125 | 0.350 | 0.085 | 0.179 |
| Inter-projection distance: Sm ($\mu$m) | 135.0 | 91.5 | 73.9 | 208.3 | 170.0 | 160.0 | 140.0 | 64.5 |
| Ra/Sm | $1.00 \times 10^{-3}$ | $1.26 \times 10^{-3}$ | $1.70 \times 10^{-3}$ | $0.33 \times 10^{-3}$ | $0.74 \times 10^{-3}$ | $2.19 \times 10^{-3}$ | $0.61 \times 10^{-3}$ | $2.80 \times 10^{-3}$ |
| Newton ring prevention effect | yes | yes | yes | no | no | yes | no | yes |
| Insulating properties | good | good | good | good | good | poor | poor | poor | layer, or either of these transparent films wherein a transparent electroconducing layer is further provided on the surface in which the projections are formed, wherein the average surface roughness (RA)/inter-projection distance (SM) of the surface comprising the projection is $0.8 \times 10^{-3} - 2.0 \times 10^{31}$ $^3$, and the inter-projection distance (SM) is 150μm or less.

6. The touch panel as defined in claim 5, wherein the Newton ring prevention film further comprises a transparent film in which projections are formed by providing a projection coating layer, or a transparent film wherein a transparent electroconducting layer is further provided on the surface on which the projections are formed, wherein the projection coating layer is a coating film wherein silica is dispersed in a resin.

7. The touch panel as defined in claim 6, wherein the silica has an average aggregate particle size of 1.0–3.0 μm and a standard deviation of 1.0 or less.

* * * * *